US006795920B1

United States Patent
Bacha et al.

(10) Patent No.: US 6,795,920 B1
(45) Date of Patent: Sep. 21, 2004

(54) VAULT CONTROLLER SECURE DEPOSITOR FOR MANAGING SECURE COMMUNICATION

(75) Inventors: Hamid Bacha, Great Falls, VA (US); Robert B. Carroll, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,235

(22) Filed: Jun. 30, 1999

(51) Int. Cl.[7] .............................. G06F 11/30; H04L 9/00
(52) U.S. Cl. ........................ 713/189; 713/164; 713/167; 713/193; 713/201
(58) Field of Search ................................. 713/189, 193, 713/194, 201, 164–167; 709/206, 229, 243

(56) References Cited

U.S. PATENT DOCUMENTS

| | | | |
|---|---|---|---|
| 4,771,459 A | | 9/1988 | Jansen |
| 4,868,877 A | | 9/1989 | Fischer |
| 4,914,176 A | | 4/1990 | Wang |
| 5,005,200 A | | 4/1991 | Fischer |
| 5,007,083 A | * | 4/1991 | Constant ..................... 713/194 |
| 5,218,637 A | | 6/1993 | Angebaud et al. |
| 5,263,165 A | | 11/1993 | Janis |
| 5,481,610 A | | 1/1996 | Doiron |
| 5,530,758 A | | 6/1996 | Marino |
| 5,629,980 A | | 5/1997 | Stefik |
| 5,640,501 A | | 6/1997 | Turpin |
| 5,729,594 A | | 3/1998 | Klingman |
| 5,742,643 A | | 4/1998 | Lee |
| 5,745,574 A | | 4/1998 | Muftic |
| 5,790,677 A | | 8/1998 | Fox |
| 5,799,285 A | | 8/1998 | Klingman |
| 5,850,442 A | | 12/1998 | Muftic |
| 6,105,131 A | * | 8/2000 | Carroll ....................... 713/155 |
| 6,148,400 A | * | 11/2000 | Arnold ....................... 713/168 |

* cited by examiner

*Primary Examiner*—Gilberto Barrón
*Assistant Examiner*—Kambiz Zand
(74) *Attorney, Agent, or Firm*—David M. Shofi

(57) ABSTRACT

A secure-end-to-end communication system for conducting electronic business includes a web server—vault controller having personal storage vaults for users, registration and certification authorities. Each personal vault runs programs on the controller under a unique platform ID, e.g. a UNIX user ID. Data storage is provided by the controller wherein the storage is owned by the same user ID assigned to the vault. User processes running in dedicated vaults are able to communicate with other User processes running in different vaults using a secure depositor running as a module in a vault process in each vault. Messages are sent from a vault process to a specific vault rather than another vault process. There is no direct communication between vault processes. In operation, if a vault process intends for a message to go to another vault, e.g. Vault V, the sending secure depositor performs the mapping from the DN of the owner of Vault V to the DN of Vault V. The secure depositor then obtains the public encryption key of Vault V from the certificate found in the X.500 directory under the DN of Vault V. The secure depositor encrypts the message with the recipient's public key and signs the message with the private signing key in the sender's vault. The secure depositor inserts the encrypted and signed message (including the signing certificate) into a queue for Vault V. On the receiving side, the receiving secure depositor retrieves the message and decrypts the message with the private decryption key in Vault V. The secure depositor verifies the signature with the included certificate, after validating the certificate and checking the appropriate Certification Revocation Lists (CRL) in the X.500 directory. A secure depositor daemon, running either in the controller or on a remote machine, is used for relaying messages between processes running in vaults on different machines.

23 Claims, 3 Drawing Sheets

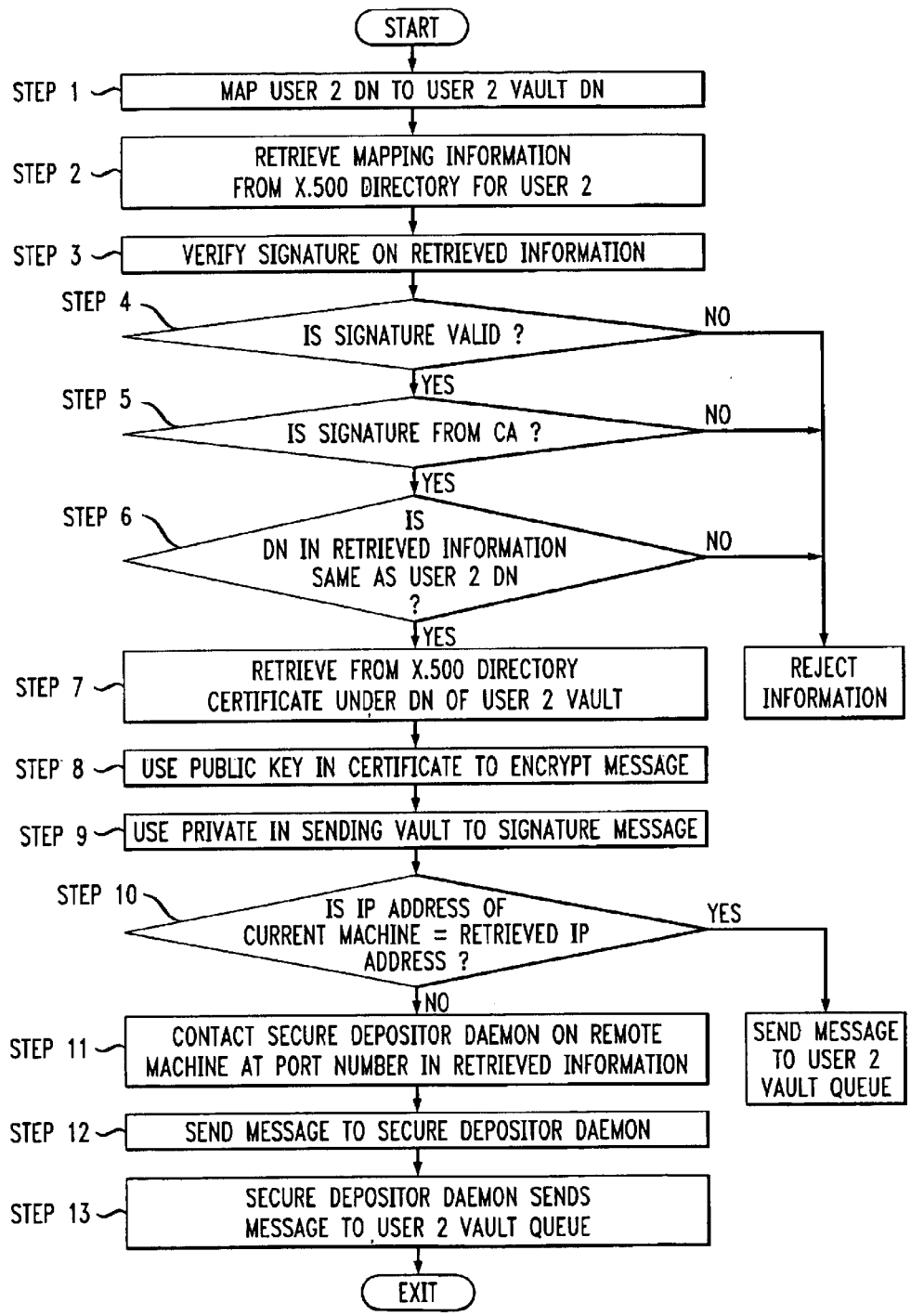

VAULT CONTROLLER SECURE DEPOSITOR FOR MANAGING SECURE COMMUNICATION

CROSS-REFERENCE TO RELATED APPLICATION

This application is related to non-provisional application Ser. No. 08/980,022, entitled "Enhanced Web Server Process & Security By Enabling Operating System Integration", filed Nov. 26, 1997, assigned to the same assignee as that of the present invention and fully incorporated herein by reference.

This application is further related to the following co-pending applications, all assigned to the same assignee as that of the present invention, and fully incorporated herein by reference:

1. Ser. No. 09/223,766 entitled "Secure Server Using Public Key Registration And Methods Of Operation", filed Dec. 31, 1998.
2. Ser. No. 09/223,764, entitled "A Secure Communication System And Method Of Operation For Conducting Electronic Commerce Using Remote Vault Agents Interacting With A Vault Controller", filed Dec. 31, 1998.
3. Ser. No. 09/223,834, "Vault Controller Based Registration Application Serving Web Based Registration Authorities and End Users for Conducting Electronic Commerce In A Secure End-to-End Distributed Information System", filed Dec. 31, 1998.
4. Ser. No. 09/223,765, entitled "Vault Controller Supervisor And Method Of Operation For Managing Multiple Independent Vault Processes & Browser Sessions For Users In An Electronic Business System, filed Dec. 31, 1998.

BACKGROUND OF THE INVENTION

1. Field of the Invention

This invention relates to a secure end-to-end communication system and methods of operation using vault technology. More particularly, the invention relates to a vault controller secure depositor and a method of operation in an electronic business system managing secure communication between vaults in a vault controller(s).

2. Background Discussion

Traditionally, organizations such as retailers, banks, and insurance companies, in conducting electronic business, register their customers or users and control their access to business software applications with a user identification ("user ID") and password. The user ID and password establish a user's identity for accessing secured information. The password is the "virtual key" that authenticates a user. However, a password does not provide the security needed for electronic business. Passwords have the following limitations:

(a) can be compromised during log-on by on-lookers;
(b) can be easily intercepted on the Internet if the transaction is not secured with a secure web protocol, such as secure sockets layer;
(c) authenticate a user to a host, but not a host to a user;
(d) can be discovered using automated "trial and error" techniques;
(e) do not protect transmitted information; and
(f) do not ensure that access is limited to authorized entities and applications.

A new approach to conducting electronic business on the Internet is described in the cross-referenced application. In this approach, digital keys replaced user identification-password pairs. Public key cryptography uses mathematically related public-private key pairs. Only the private key can decrypt the information the public key has encrypted. Only the public key can verify signature performed by the private key. The public key can be made available to any one. The private key is kept secret by the holder.

Just as digital keys are replacing user identification-password pairs in electronic business, digital signatures are replacing physical signatures. A digital signature is a coded message affixed to a document or data that helps guarantee the identity of the sender, thereby providing a greater level of security than a physical signature. A digital signature identifies the sender because only the sender's private key can create the signature. The key also helps ensure the content of the signed message cannot be altered without the recipient being able to discover that the message has been altered.

Digital certificates are also replacing their physical counterpart—hard copy credentials—in electronic business. A digital certificate, issued by a certification authority, vouches for (or certifies) the key of an individual, software application, organization or business. The certificate performs a role similar to that of a driver's license or medical diploma—the certificate certifies that the bearer of the corresponding private key is authorized (by an organization) to conduct certain activities with that organization.

However, the life cycle of digital certificates is similar to that of physical certificates. Digital certificates are issued for a specific amount of time. The certificate may be temporarily suspended under certain conditions and reissued at a later time. The certificate may be permanently revoked by the organization. Finally, digital certificates expire. For secure end-to-end communication in electronic business, the certificate must be validated to determine whether the certificate has expired, been revoked or suspended.

Digital certificates are issued through authorized registrars known as Registration Authorities (RAs). The authorities determine whether the applicant should be authorized to access secure applications or services and set in motion the processes to issue a certificate. A Certification Authority (CA) issues the digital certificate after approval by the Registration Authority. The certificate is a binding between a public key and an identity, e.g. a person, organization or computer device. The certificate includes a subject name; issuer name; public key; validity period; unique serial number; CA digital signature. The CA guarantees the authenticity of the certificate through its digital signature. The certificate may be revoked at any time. The serial numbers of revoked certificates are added to a Certification Revoked List ("CRL") published in an X.500 Directory based on a standard defined by the International Telecommunications Union ("ITU"). The X.500 standard is now being used to implement a "white pages" for the Internet service. That is, a directory of people, computers, services, and of course electronic mail addresses. This on-line directory provides a single, global source of information that is constantly updated.

IBM "Vault" technology, described in the related application Ser. No. 08/980,022, supra provides strong authentication of clients and servers using digital keys and digital certificates for conducting electronic business. "Vault" technology is described in the above cross-related application. Briefly stated, "Vault" technology provides a secure environment in a web server using a vault controller (hereinafter, web server-vault controller) for running a secure web-based registration process and enabling secure application. The controller provides security from other processes running on the same server and secure areas or personal storage vaults to which only the owner has a key. System operators, administrators, certificate authorities, registration authorities and others cannot gain access to stored information or secure processes in such personal vaults. Combined with a Secure Sockets Layer (SSL) protocol, the controller enables secure registration transactions that require multiple sessions using personal vaults. SSL, an EETF standard communication protocol, has built-in security services that are as transparent as possible to the end user and provides a digitally secure communication channel. The personal vault is owned by a particular platform Identification (ID), e.g. a UNIX ID account that is linked to a user with a specific Vault Access Certificate. The content of the vault is encrypted and contains an encryption key pair and signing key pair, both of which are passwords protected. Each vault has a unique Distinguished Name (DN) in an X.500 directory that provides storage for specific items essential to a Public Key Infrastructure (PKI). PKU uses digital certificates, certificate authorities, registration authorities, certificate management services, and distributed directory services to verify the identity and authority of each party involved in any transaction over the Internet. The common name portion of a Distinguished Name is based on a unique vault ID. In addition, the controller provides a unique mapping between the vault ID (which identifies the UNIX user account and the user's home directory) and the Vault Access Certificate which enables an end-user to access a vault through a browser.

As a part of a secure end-to-end communication system conducting electronic business using vault technology, a need exists to send an receive messages securely between vaults in a controller and between vaults running in different vault controllers, even when no vault process is running in the recipient vault (i.e. the vault is inactive).

SUMMARY OF THE INVENTION

An object of the invention is a secure end-to-end communication system and method of operation for conducting electronic business using vault technology and handling communications securely between vault processes running in different vaults of a vault controller(s).

Another object is a secure depositor in a vault handling local or remote vault to vault secure communication.

Another object is a secure depositor daemon handling secure communications between vaults located in different controllers.

Another object is a secure depositor system and method for encrypting/decrypting messages transmitted between vaults in a local controller and with a vault in a remote controller.

Another object is a secure depositor system and method providing digital signatures for sending digitally signed and encrypted messages between vaults in a vault controller(s).

Another object is a secure depositor system and method verifying digital signatures for receiving digitally signed and encrypted messages between vaults in a vault controller(s).

Another object is a secure depositor system and method in a vault controller sending messages from a vault process to a specific vault rather than directly to another vault process.

Another object is a secure depositor system and method within a vault process which encrypts and sends messages to a secure depositor queue of a receiving vaults(s) which decrypts and verifies the message for the receiving vault process.

Another object is a secure depositor system and method within a vault process mapping from a vault owners Distinguished Name (DN) in a vault access certificate to a vault DN using signed information stored in an X.500 directory.

These and other objects, features, and advantages are achieved in a secure-end-to-end communication system for electronic business system and method of operation using vault technology, in which users interact with web server-vault controllers in a secure manner using a cryptographic protocol; digital keys and digital certificates. The web server—vault controller provides personal storage in vaults in the controller for users, registration authorities and certification authorities. Each personal vault runs programs on the controller under a unique platform ID, e.g. a UNIX user ID. Data storage is provided by the controller wherein the storage is owned by the same user ID assigned to the vault. User processes running in dedicated vaults are able to communicate with other User processes running in different vaults using a secure depositor running in each vault. There is no direct communication between vault processes. In operation, if a vault process intends for a message to go to another vault, e.g. Vault V, the sending secure depositor performs the mapping from the DN of the owner of Vault V to the DN of Vault V. The secure depositor then obtains the public encryption key of Vault V from the certificate found in the X.500 directory under the DN of Vault V. The secure depositor encrypts the message with recipient's public key and signs the message with a private key of the originating vault. The secure depositor inserts the encrypted and signed message (including the signing certificate) into a queue for Vault V. On the receiving side, the receiving secure depositor retrieves and decrypts the message with the private decryption key in Vault V. The receiving secure depositor verifies the signature with the included certificate, after validating the certificate and checking the appropriate Certification Revocation Lists (CRL) in the X.500 directory. A secure daemon is used for relaying messages between processes running in vaults on different machines. The daemon receives messages from local or remote vaults and inserts them into the queues of the destination vault.

DESCRIPTION OF DRAWING

The invention will be further understood from the following detailed description of a preferred embodiment, taken in conjunction with the appended drawing, in which:

FIG. 3 is a flow diagram of the secure message passing performed in FIG. 2.

DESCRIPTION OF PREFERRED EMBODIMENT

Figure 1:
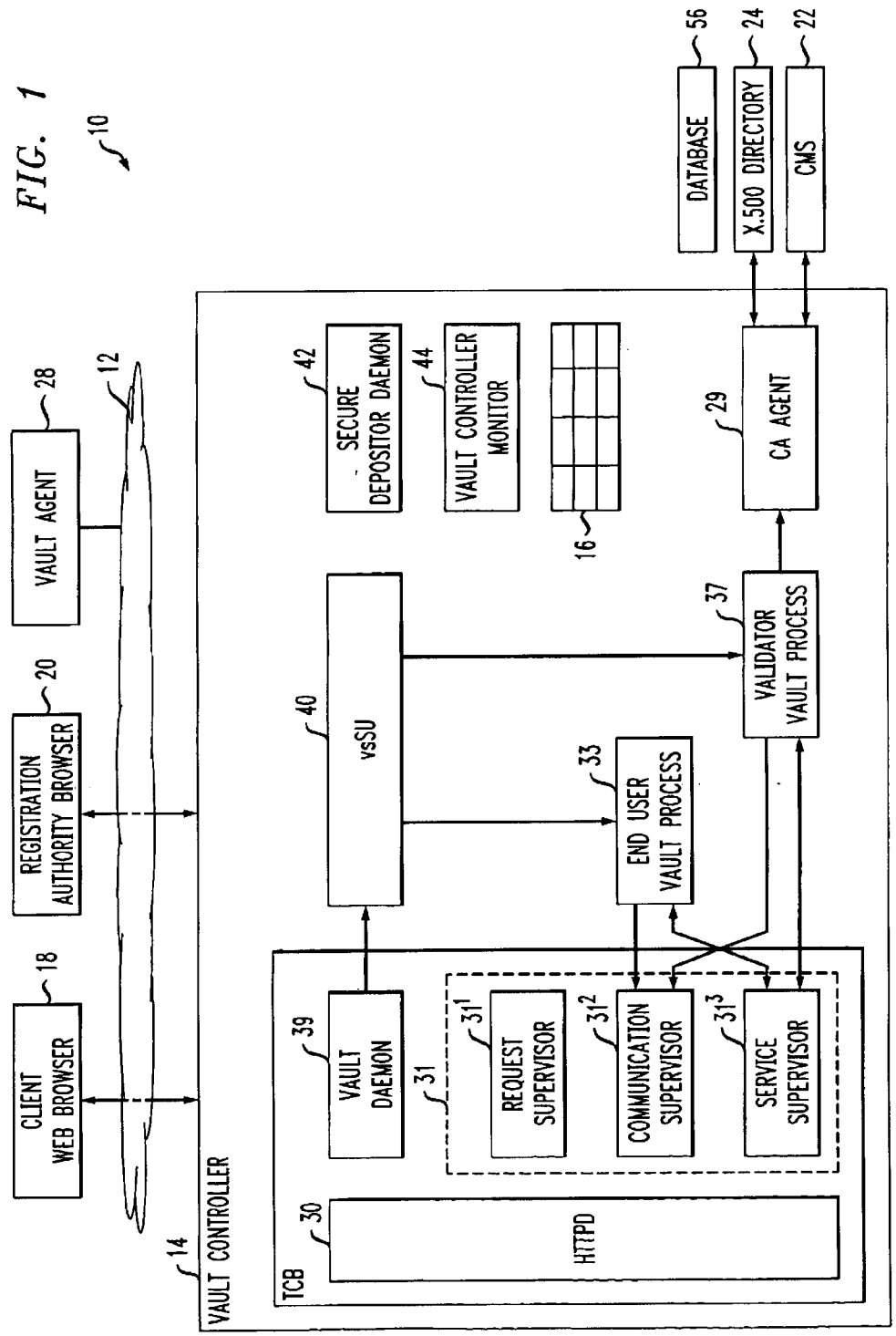
FIG. 1 is a representation of a vault controller in a secure end-to-end communication system interacting with users, vault agents, and registration authorities and incorporating the principles of the present invention.

In FIG. 1, a secure-end-to-end communication system 10 for conducting electronic business in a distributed network 12, e.g., the Internet, includes an enhanced web server-vault controller 14 which provides processes and storage in personal vaults 16 for users 18, Registration Authorities (RAs) 20, Certificate Management System (CMS) 22, and an X.500 directory 24. An external vault agent 28 is an optional lightweight vault process designed to run remotely at a customers location. The agent incorporates a small subset of the vault process functionality. The subset enables the agent to exchange secures messages with vault processes running under the control of the vault controller. Further details of the vault agent are described in copending application Ser. No. 09/223,764, filed Dec. 31, 1998, supra.

The personal vaults 16 provide a secure environment for executing programs and applications on behalf of designated users. Personal vaults and their contents are accessible from SSL-enabled web browsers operated by the user 18. In one form, a personal vault is a directory in a storage area, e.g. a disk drive Access to personal vaults requires a vault access certificate and a private key. Information stored in personal vaults is protected against disclosure to unauthorized persons (such as System Administrators and other vault owners) by encryption; against tampering by digital signature; and against untrusted communnications with unknown parties by authentication using digital certificates. Information can also be transmitted securely to other local vaults within the controller and with external or remote vaults through a secure depositor (not shown) included in each vault . The secure depositor will be further described hereinafter in conjunction with FIG. 2.

In conducting electronic business, the registration authority 20 reviews each user registration request that is submitted; validates the request; and then approves or rejects the request. The registration decision is provided to a certification agent 29, which uses the certificate management system 22 to issue, suspend, resume, renew or revoke X.509v3 certificates to users whose registration requests are approved. Additionally, the certification authority publishes certificates, Certificate Revocation Lists (CRL), and policy information of organizations relative to electronic business in an X.500 directory 24. The X.509v3 certificates, CRL's, CA policies and other information about registered users and servers is stored in the X.500 Directory. An authorized user or software application can find a public key certificate for a particular person or server by searching the Directory for that person's or server's unique distinguishing name or other relevant information. The Distinguished Name (DN) is a unique name of a data entry stored in the X.500 Directory. The DN uniquely identifies the position of an entry in the hierarchical structure of the Directory. Further details of the Registration and Certification Authorities are described in Ser. No. 09/223,834, filed Dec. 31, 1998, supra.

Continuing with FIG. 1, the vault controller provides secure end-to-end communication, beyond the controller, using browser client authentication and SSL protocol. The browser request is encrypted and sent to the vault controller along with a vault access certificate. The controller consists of three major components. A web server 30, e.g. Lotus Domino web server; a vault process supervisor 31 (e.g., comprising request supervisor $31^1$, communication supervisor $31^2$, and service supervisor $31^3$) and vault processes 33. The Lotus Domino Go web server is a secure, scalable, high performance, transaction-ready web server that: (a) allows a web browser to interface with the vault controller; (b) communicate securely with vault controller software via the SSL protocol; and (c) authenticate a user's digital certificate and key. The vault controller 14 may also comprise a validator vault process 37, a vault daemon 39, vsSU 40, a secure depositor daemon 42 (described below in the context of FIG. 2), and vault controller monitor 44. The secure end-to-end communication system 10 may also comprise a database 56.

The vault process supervisor validates and maps the vault access certificate to a unique vault ID and password. In a first step, a vault process is launched, if one is not already running, on behalf of that user to handle the user's request. In a second step, the vault process supervisor maintains a state table for determining whether a vault process is already running on behalf of the user. If a vault process is already running, the supervisor will attach the user to the existing vault process. In a third step, the vault process responds to the user request. The vault process shuts down after a predetermined period of inactivity, but until that period is reached, the process may be automatically activated when a user request is received. Further details of the vault process supervisor are described in Ser. No. 09/223,765, filed Dec. 31, 1998, supra.

Each vault process is multithreaded and able to handle multiple, simultaneous requests from the user. Additionally, each thread has its own local storage area allowing it to maintain "state" across multiple browser-server interactions.

Entries in the X.500 Directory and the certificates in the vault enable users to encrypt and sign data (through the secure depositor) for any other user on the system that has a vault. This information is safely encrypted in the public key of the recipient.

Figure 2:
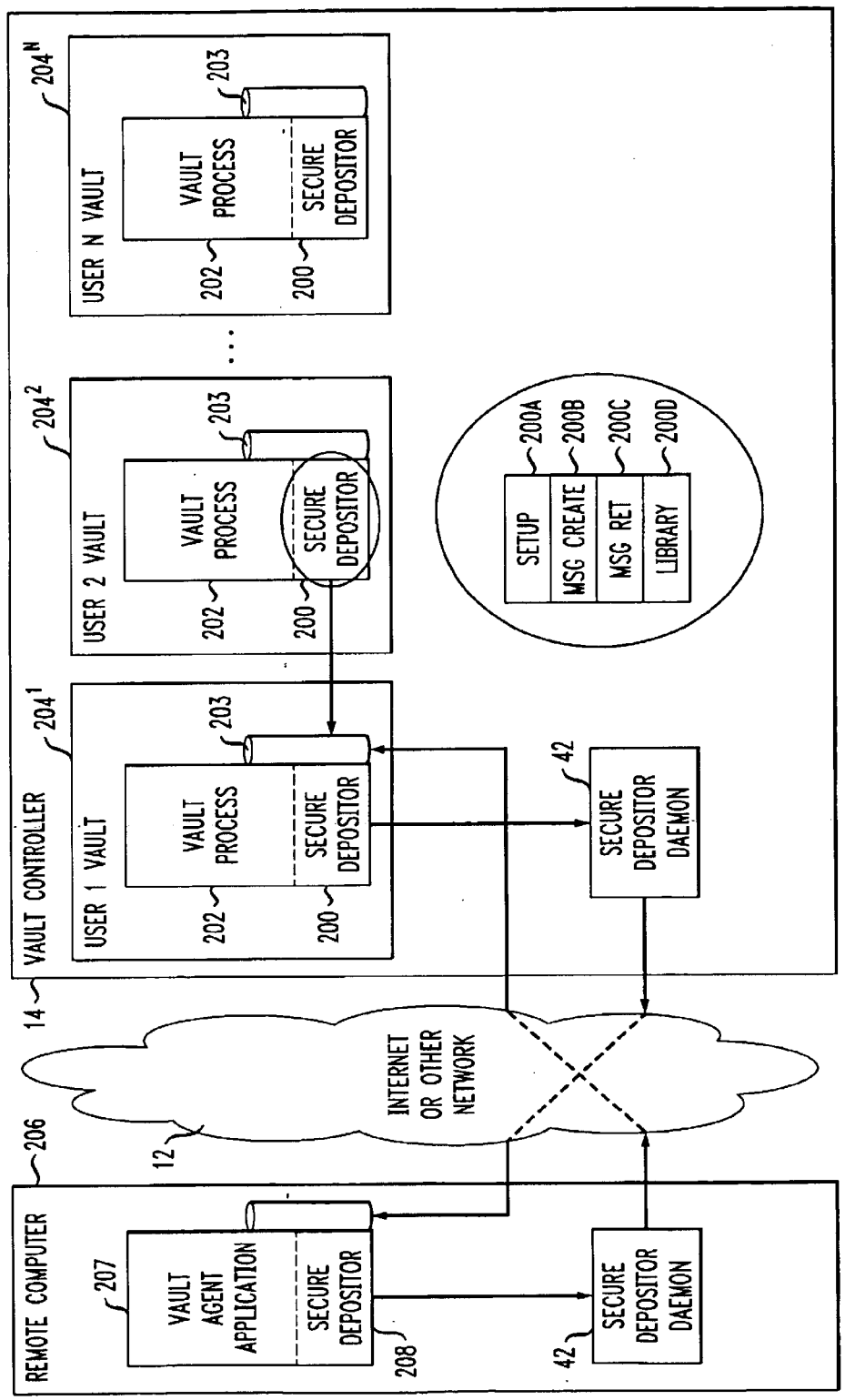
FIG. 2 is a representation of a Secure Depositor in FIG. 1 passing secure messages between vaults in the same Vault Controller (User Vault 1 and User Vault 2) and also between User Vault 1 via a network and a remote vault associated with a Vault Agent, the remote vault communication being mediated by a Secure Depositor Daemon.

In FIG. 2, a Secure Depositor 200 is a module within a Vault Process 202 running in a vault 204. As shown in the inset each Secure Depositor comprises three principal functions: A Set-Up and Administration function 200(A); a Message Creation function 200(B); a Message Retrieval function 200(C); and a Secure Depositor Library 200(D). The secure depositor library functions including mapping distinguished names, encrypting and decrypting messages, and validating messages. The secure depositor library also provides secure communication between vault processes by intervening in vault-to-vault communications. Each depositor has a queue 203 for storing messages received from other processes. A dedicated vault $204^1$ . . . $204^N$ is assigned to each user. A remote computer 206 running a Vault Agent application 207 includes a depositor 208 as part of the Vault Agent toolkit. The computer 206 is coupled to the controller 14 through the network 12, typically the Internet. The Depositor is responsible for secure communication between vault processes running in the local controller 14 and with vault processes running in remote computers 206. Messages are sent from a vault process to a specific vault rather than a vault process. In other words, there is no direct communication between vault processes. When a vault process running in vault $204^2$ wants to send a message to vault $204^1$, the Secure Depositor encrypts and signs the message before inserting it into the queue $203^1$ in vault $204^1$. If the process $202^1$ happens to be running in vault and monitoring queue $203^1$, the process will immediately receive the message. The process also uses its instance of the Secure Depositor to retrieve the message from its queue. The Secure Depositor decrypts the message and verifies the signature before returning the message content.

Messages exchanged between vaults that are under the jurisdiction of a vault controller are handled directly by the Secure Depositor. Messages exchanged between vaults located on different machines (vaults that are part of Vault Agents or vault under the jurisdiction of vault controllers whose Vault CA's are cross-certified) are handled through a Secure Depositor Daemon 42. The Secure Depositor on the sender machine connects to the Secure Depositor Daemon on the receiving machine and delivers the signed and encrypted message. The Secure Depositor Daemon is responsible for delivering the message to the appropriate vault.

As indicated previously, a vault owner is associated with every vault. Each owner has obtained a vault access certificate through a Registration process described in Ser. No. 09/223,834, supra. There is a direct mapping from the vault access certificate in the browser of the vault owner and the vault ID. However, vault IDs are cryptic and there is no direct way of tracing them back to their owners. In other words, vaults are anonymous (although not secret!). If a vault process wants to send a message to vault V, it has to send it to the owner of vault V. The Secure Depositor performs the mapping from the Distinguished Name of the owner of vault V to the Distinguished name of vault V. The Depositor then obtains the public encryption key of vault V from the certificate found in the X.500 directory under the DN of vault V. The Depositor encrypts the message with the recipient vault's public key, then signs it with the private signing key in its own vault. Finally, the Depositor inserts the encrypted and signed message (including the signing certificate) into the receiving queue in vault V. On the receiving side, another instance of the Secure Depositor retrieves the message and decrypts it with the private decryption key in vault V. The receiving Depositor then verifies the signature with the included certificate, after validating the certificate and checking the appropriate Certificate Revocation List in the X.500 directory.

Messages are never really inserted into a queue. Messages are stored in a "public" directory (not shown) in the receiving vault. Header information about the message, including a fully qualified file pointer, is inserted into the queue. All messages include a type and a priority. The Secure Depositor allows message to be retrieved by type, priority, or both. This means that the physical queue is really a collection of virtual queues based on type and priority. Messages are retrieved FIFO from the virtual queues, but not necessarily from the physical queue. When a message is read, it is marked for deletion. The Secure Depositor performs trash collection whenever a pre-configured number of deleted messages are reached.

The mapping between a vault owner's Distinguished Name (as stated in the vault access certificate) and the corresponding vault's Distinguished Name is determined by the Vault Supervisor 32 (See FIG. 1) when the vault is created. This mapping is then stored in the X.500 directory under the owner's DN, together with other information about the vault. This information is currently stored as a signed record under the "comment" attribute of the X.500 Directory node associated with the vault owner's Distinguished Name. The record is signed by the CA Agent 29 (See FIG. 1) associated with the Vault CA to prevent tampering with the information. The signed record includes:

the DN of the vault owner, the DN of the vault, the IP address of the machine where the vault is deployed, the TCP/IP port number of the Secure Depositor Daemon, the cryptographic strength (encryption key size and encryption algorithm) allowed for this vault.

The DN of the vault owner is included to ensure the signed record is not, perhaps maliciously, moved to another node, thereby re-associating the vault with some other owner and causing messages to be directed to the wrong vault. The IP address is included to allow the Secure Depositor to locate the vault wherever it may be deployed and securely deliver a message to it. If it is determined that a vault is on a remote machine, the IP address and the TCP/IP port number are used to deliver the message to the remote Secure Depositor Daemon. The cryptographic strength is used by the Secure Depositor to determine the maximum level of encryption that the vault can handle. The Secure Depositor tries to encrypt with the maximum strength the recipient vault can handle without exceeding the encryption strength of the sender vault.

The Secure Depositor Daemon 42 is used for relaying messages between processes running in vaults on different machines. The daemon is usually used for communication between vault processes running on a machine hosting the Vault Controller and a remote machines hosting Vault Agent applications. The daemon receives messages from remote vaults and inserts them into the queues of the destination local vaults.

When a message is sent from one vault to another, the Secure Depositor maps the DN of the vault owner to that of the vault DN. The depositor also obtains, from the X.500 directory, the IP address of the machine on which the vault is located. This information is stored in a signed record as a value of the "comment" attribute under the user DN. The depositor then compares this IP address to that of the local machine. If they match, the message is inserted into the queue of the local destination vault. If they do not, the Secure Depositor attempts to open a TCP/IP socket connection to the Secure Depositor Daemon, using the port number indicated in the signed record. If no Secure Depositor Daemon is running on the remote machine, the message delivery fails. If it is running, an encrypted and signed message is delivered, together with information about the recipient vault. The role of the Secure Depositor Daemon is to insert the received message into the queue of the destination vault on its local machine.

FIG. 3 describes secure messaging between the vault processes running in FIG. 2, in which different User Vaults (UV) 1 and 2 are in the same controller 14 and the remote vault agent application 207 is in the remote computer 206 coupled to the controller 14 and User Vault 2 through the network 12, as follows:

Step 1. The UV 1 secure depositor performs a mapping from the Distinguished Name of the owner of UV 2 to the UV 2 vault Distinguished Name.

Step 2. The UV 1 secure depositor retrieves the mapping information from the X.500 directory for UV 2.

Step 3. The UV 1 secure depositor verifies the signature on the received information.

Step 4. A test is performed to determine if the signature is valid. A "no" condition rejects the X.500 information and the message is not sent. A "yes" condition initiates a test to determine if the signature is from the proper certification agent.

Step 5. In the signature test, a "no" condition rejects the signature and the message is not sent. A "yes" condition initiates a test to compare the DN in the retrieved information to the UV 2 DN.

Step 6. In the comparison test, a "no" condition rejects the message. A "yes" condition initiates the next Step.

Step 7. The digital certificate under the DN of UV 2 vault is retrieved from the X.500 directory.

Step 8. The public key in the certificate is used to encrypt the message to UV 2.

Step 9. The UV 1 private key is used to sign the message.

Step 10. UV 1 performs a test to determine if the IP address of UV 2 in the retrieved X.500 information is the same machine as that of UV 1. A "yes" condition sends the message to the UV 2 vault queue. A "no" condition proceeds to obtain the port number of the remote machine in the retrieved X.500 information for UV 2

Step 11. The secure depositor daemon listening on the port number is alerted to a message for UV 2.

Step 12. The message is sent to the secure depositor daemon for UV 2.

Step 13. The UV 2 secure depositor daemon sends the message to UV 2.

Summarizing, a secure depositor takes a distinguished name of a target vault owner to access the appropriate record from an X.500 Directory and extracts attributes relating to the vault owner: vault ID; vault path; vault IP address; and vault encryption level. When the secure depositor retrieves the signed message from the X.500 directory under the user DN, the depositor extracts the vault name from the signed message. Combining the vault owner DN and the vault name in the signed message provides two benefits. The first benefit is that the secure depositor can verify that the vault name is actually bound to the user DN and this binding has not been modified. The second benefit is that if someone has replaced the signed message in the user DN record with that from another record, the user DN of the signed message will not match the DN in the X.500 Directory record. The secure depositor will then reject the encryption attempt.

While the present invention has been described in a preferred embodiment, various changes may be made in form and spirit without departing from the scope of the invention as defined in the appended claims, in which:

We claim:

1. Apparatus for use in establishing a secure exchange of information for use by end users or entities in a distributed network environment, the apparatus comprising:

a network-based controller accessible by the end users or entities in the distributed network environment and operative to: (i) control secure areas, wherein a secure area is accessible by an authenticated end user or entity for storing data and for executing one or more processes; (ii) maintain a secure depositor with each secure area such that a first secure area can securely communicate with at least a second secure area without direct communication between a process of the first secure area and a process of the at least a second secure area.

2. The apparatus of claim 1, wherein the at least a second secure area is remote from the first secure area.

3. The apparatus of claim 1, wherein the controller is further operative to maintain a queue with each secure area for use in storing and retrieving message information exchanged between different secure areas.

4. The apparatus of claim 1, wherein a secure depositor of the controller is operative to access a directory comprising a plurality of data entries, each entry having a unique name associated therewith.

5. The apparatus of claim 4, wherein a secure depositor of the controller is operative to map a unique name of an owner of a secure area to a unique name of a corresponding secure area.

6. The apparatus of claim 4, wherein a secure depositor of the controller is operative to obtain a public encryption key of another secure area from a certificate found in the directory under the unique name of the secure area.

7. The apparatus of claim 1, wherein a secure depositor of the controller is operative to at least one of encrypt a message and sign a message.

8. The apparatus of claim 1, wherein a secure depositor of the controller is operative to insert at least one of an encrypted message and a signed message into a queue associated with another secure area.

9. The apparatus of claim 1, wherein a secure depositor of the controller is operative to retrieve a message and decrypt the message.

10. The apparatus of claim 1, wherein a secure depositor of the controller is operative to verify a signature of a certificate, after validating the certificate and checking a certification/revocation list in a directory.

11. The apparatus of claim 1, wherein a communicated message is defined by at least one of a priority and a type.

12. A method for use in establishing a secure exchange of information for use by end users or entities in a distributed network environment, the method comprising the steps of:

in accordance with a network-based controller accessible by the end users or entities in the distributed network environment, the controller:

controlling secure areas, wherein a secure area is accessible by an authenticated end user or entity for storing data and for executing one or more processes; and maintaining a secure depositor with each secure area such that a first secure area can securely communicate with at least a second secure area without direct communication between a process of the first secure area and a process of the at least a second secure area.

13. The method of claim 12, wherein the at least a second secure area is remote from the first secure area.

14. The method of claim 12, wherein the controller maintains a queue with each secure area for use in storing and retrieving message information exchanged between different secure areas.

15. The method of claim 12, wherein a secure depositor of the controller accesses a directory comprising a plurality of data entries, each entry having a unique name associated therewith.

16. The method of claim 15, wherein a secure depositor of the controller maps a unique name of an owner of a secure area to a unique name of a corresponding secure area.

17. The method of claim 15, wherein a secure depositor of the controller obtains a public encryption key of another secure area from a certificate found in the directory under the unique name of the secure area.

18. The method of claim 12, wherein a secure depositor of the controller at least one of encrypts a message and signs a message.

19. The method of claim 12, wherein a secure depositor of the controller inserts at least one of an encrypted message and a signed message into a queue associated with another secure area.

20. The method of claim 12, wherein a secure depositor of the controller retrieves a message and decrypts the message.

21. The method of claim 12, wherein a secure depositor of the controller verifies a signature of a certificate, after validating the certificate and checking a certification/revocation list in a directory.

22. The method of claim 12, wherein a communicated message is defined by at least one of a priority and a type.

23. An article of manufacture for use in establishing a secure exchange of information for use by end users or entities in a distributed network environment, comprising a machine readable medium containing one or more programs which when executed implement the steps of:

in accordance with a network-based controller accessible by the end users or entities in the distributed network environment, the controller:

controlling secure areas, wherein a secure area is accessible by an authenticated end user or entity for storing data and for executing one or more processes; and maintaining a secure depositor with each secure area such that a first secure area can securely communicate with at least a second secure area without direct communication between a process of the first secure area and a process of the at least a second secure area.

\* \* \* \* \*